US009458867B2

(12) United States Patent  
Maunder

(10) Patent No.: US 9,458,867 B2  
(45) Date of Patent: Oct. 4, 2016

(54) SYSTEM FOR MODULAR CONNECTION

(71) Applicant: Martha Maunder, St. Petersburg, FL (US)

(72) Inventor: Martha Maunder, St. Petersburg, FL (US)

( * ) Notice: Subject to any disclaimer, the term of this patent is extended or adjusted under 35 U.S.C. 154(b) by 273 days.

(21) Appl. No.: 14/046,674

(22) Filed: Oct. 4, 2013

(65) Prior Publication Data

US 2014/0099159 A1 Apr. 10, 2014

Related U.S. Application Data

(60) Provisional application No. 61/709,828, filed on Oct. 4, 2012.

(51) Int. Cl.
*F16B 5/00* (2006.01)
*A63H 33/10* (2006.01)
*A41D 31/00* (2006.01)

(52) U.S. Cl.
CPC ........... *F16B 5/0024* (2013.01); *A63H 33/105* (2013.01); *F16B 5/0048* (2013.01); *A41D 31/0005* (2013.01); *Y10T 403/553* (2015.01)

(58) Field of Classification Search
CPC .. F16B 5/0024; F16B 5/0032; F16B 5/0044; F16B 5/0048; Y10T 403/347; Y10T 403/342; A63H 33/10; A63H 33/105; A63H 33/048; A63H 33/086
See application file for complete search history.

(56) References Cited

U.S. PATENT DOCUMENTS

| | | | |
|---|---|---|---|
| 269,789 A | * | 12/1882 | Jaeger ................. A63H 33/105 |
| | | | 273/156 |
| 376,702 A | | 1/1888 | Bayer |
| 481,207 A | | 8/1892 | Smith |
| 487,939 A | | 12/1892 | Smith |
| 715,516 A | | 12/1902 | Sessions |
| 1,681,958 A | | 8/1928 | Stevenson |
| 1,801,559 A | | 4/1931 | Kellogg |
| 1,988,085 A | * | 1/1935 | Orlando .................... B64C 3/00 |
| | | | 244/123.8 |
| 3,103,050 A | | 9/1963 | Reitmeier |
| 3,426,397 A | | 2/1969 | Redden |
| 3,460,282 A | | 8/1969 | Swirsky |

(Continued)

FOREIGN PATENT DOCUMENTS

DE 747511 C 10/1944
GB 831725 A 3/1960

*Primary Examiner* — Jonathan Masinick
(74) *Attorney, Agent, or Firm* — St Onge Steward Johston and Reens LLC

(57) ABSTRACT

A modular connection system has a plurality of modular units, each having a plurality of loop and edge sections alternating around the perimeter of a body section. The loop sections align with the edge sections so that a loop section of one unit is adjacent to a loop section of another unit. A connection interface is located at a vertex of the modular units and a loop of first one of the plurality of modular units is adapted to align parallel to an edge section of a next modular unit and a loop of each next unit is adapted to align parallel to an edge section of the preceding unit. Elongated connectors pass through the loop sections of the modular units to connect the modular units at the connection interface.

23 Claims, 16 Drawing Sheets

(56) References Cited

U.S. PATENT DOCUMENTS

| | | | |
|---|---|---|---|
| 3,698,045 A * | 10/1972 | Redden | E04H 15/22 24/580.1 |
| 4,218,047 A | 8/1980 | Douglas | |
| 4,231,135 A | 11/1980 | Fradin | |
| 4,719,788 A | 1/1988 | Musil | |
| 5,182,933 A | 2/1993 | Schick | |
| 5,207,037 A * | 5/1993 | Giles | F16B 5/0044 52/126.4 |
| 5,632,071 A | 5/1997 | Maunder | |
| 6,004,182 A * | 12/1999 | Pasin | A63H 33/10 135/119 |
| 2006/0145418 A1* | 7/2006 | Plein | A63F 9/1288 273/155 |
| 2007/0051055 A1* | 3/2007 | Lin | A63H 33/086 52/81.1 |

\* cited by examiner

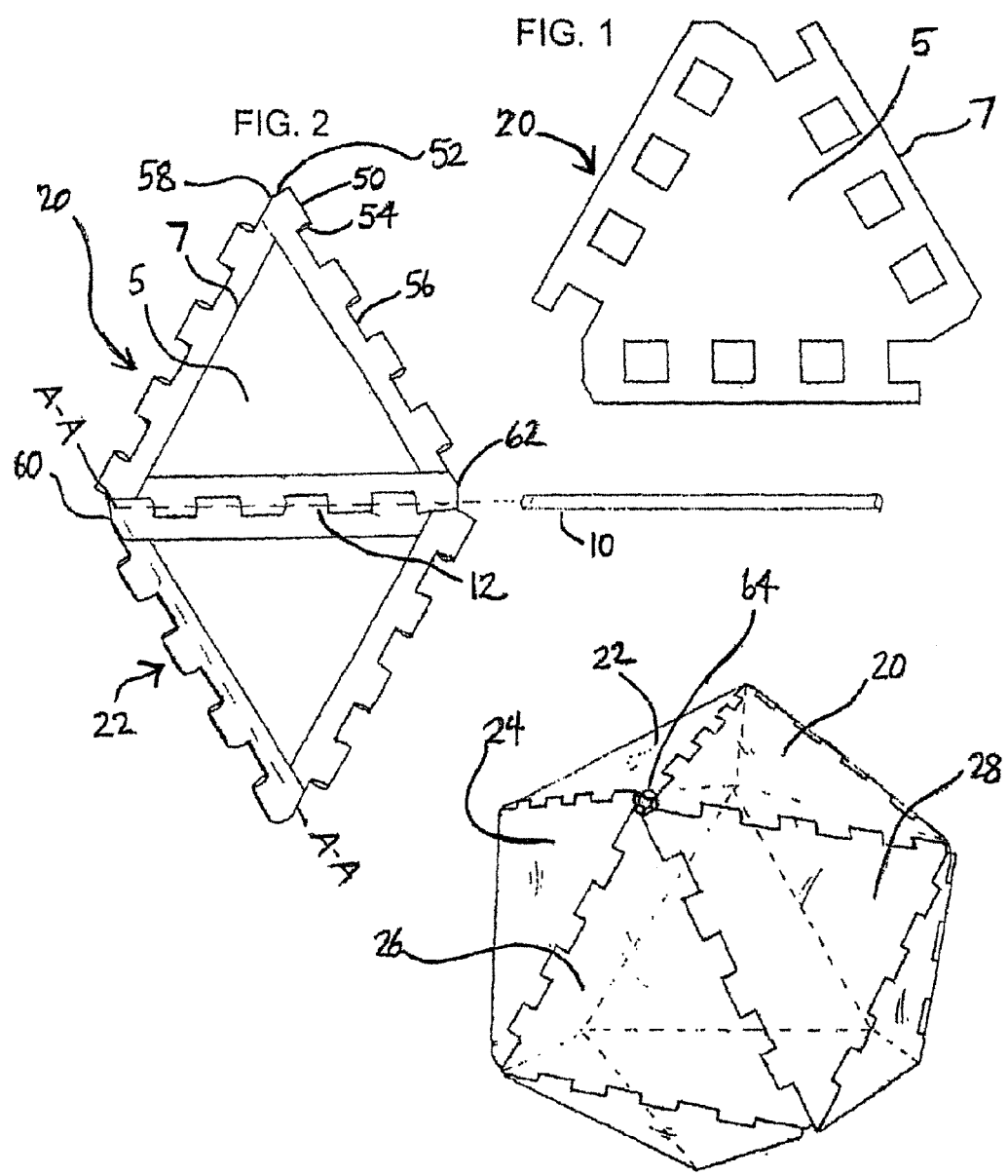

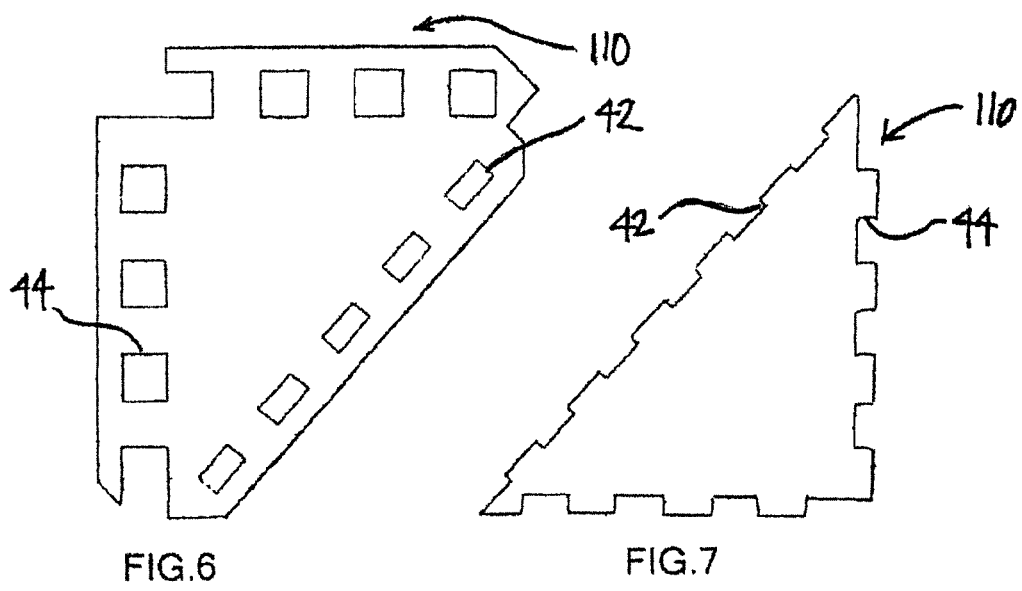
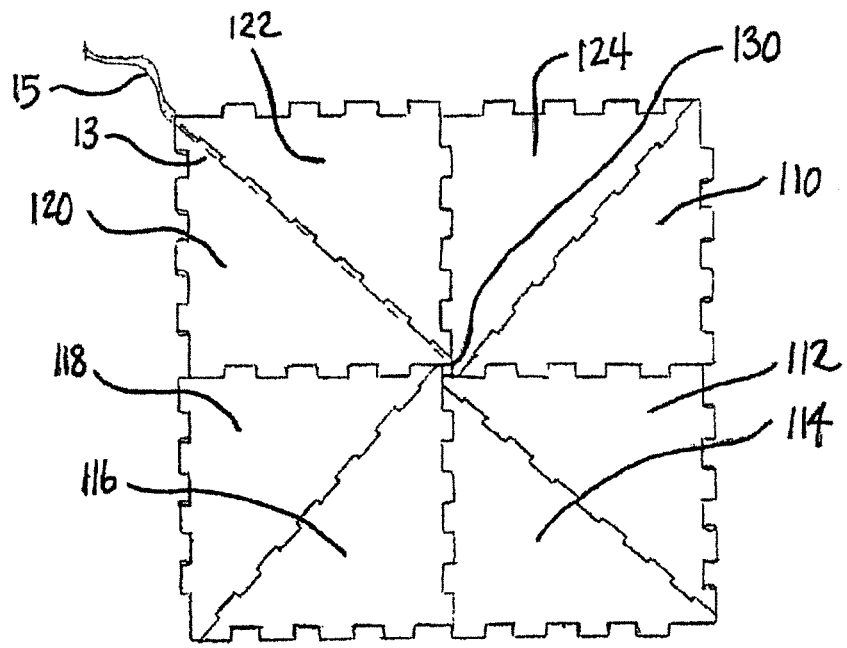
FIG.6
FIG.7
FIG.8

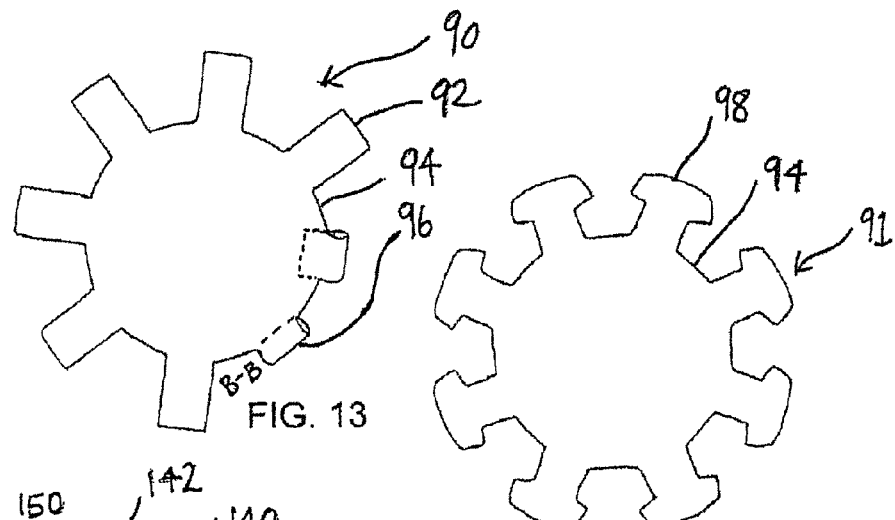
FIG. 13
FIG. 13a
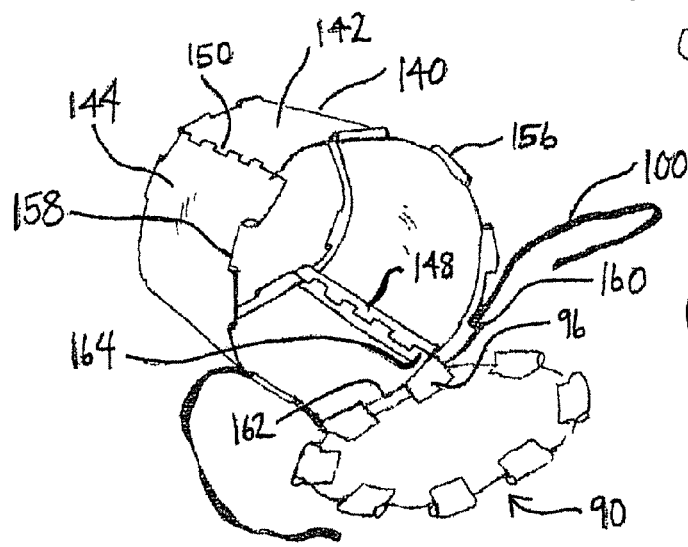
FIG. 14
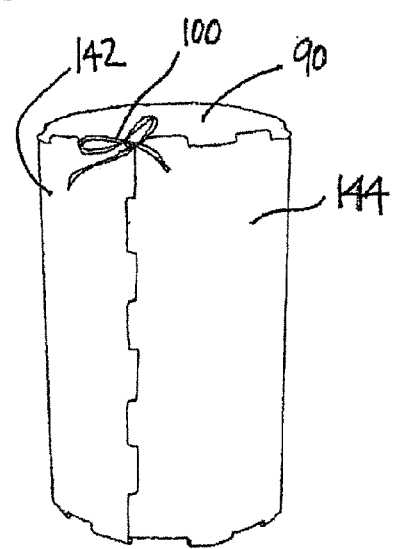
FIG. 15

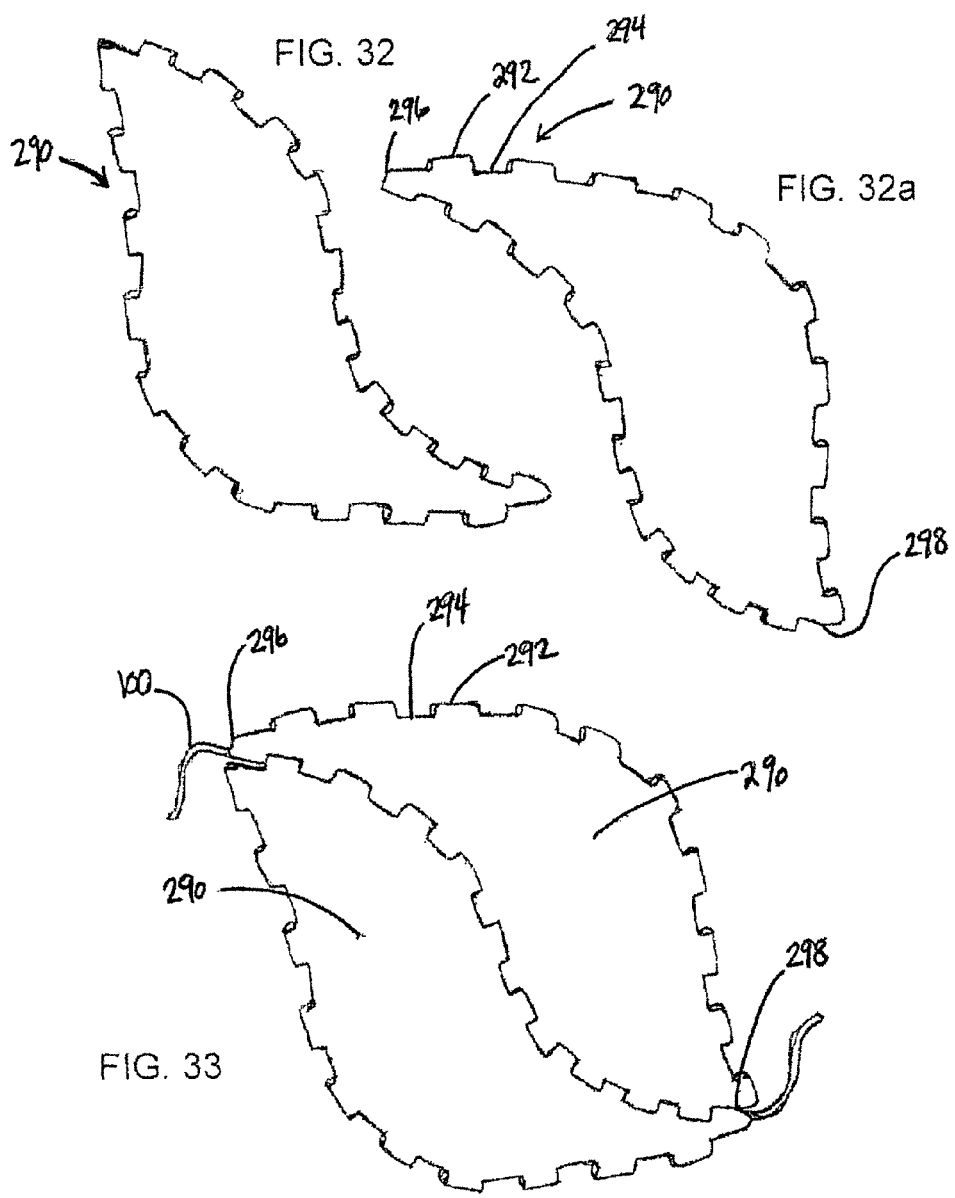

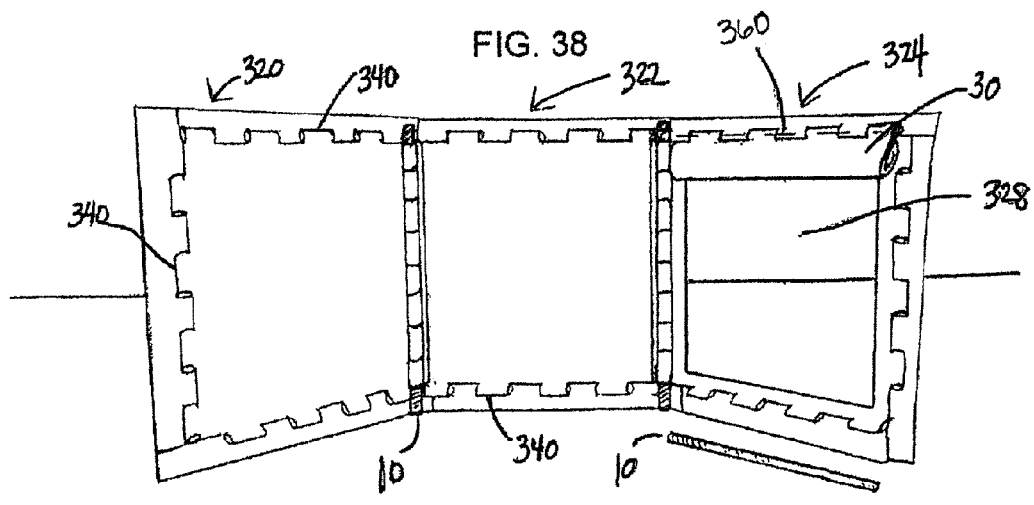
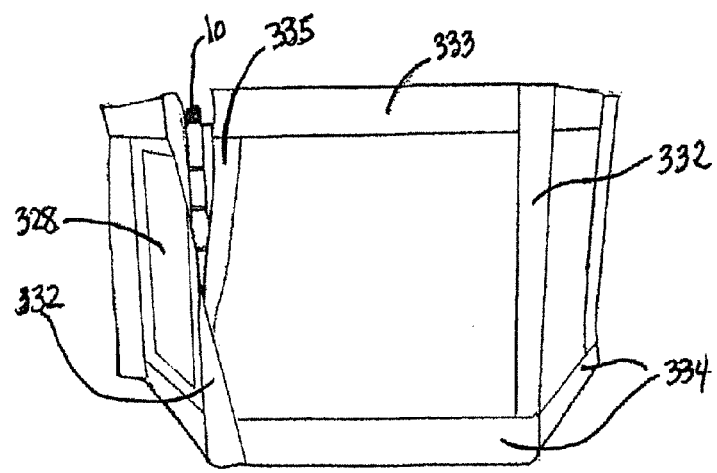
FIG. 39

SYSTEM FOR MODULAR CONNECTION

FIELD OF THE INVENTION

The present invention relates to a system and method for modular connection. More particularly, the system and method are for producing and assembling modular units into two or three dimensional products having a variety of applications.

BACKGROUND OF THE INVENTION

A modular system is typically described as having interchangeable modules which once assembled, can also be separated, rearranged, and reassembled into products and applications of differing size, shape, complexity, or function. Modular products have been and are now primarily fabricated from rigid materials such as wood, metal, cast plastic or stone, and are assembled into walls, ceilings, flooring, furniture, closet and shelf systems, and various other products and applications. However, most rigid material modular units require a large assortment of hardware and parts, use of hand or power tools, and detailed drawings and instructions to fasten the units together. Once assembled, separating the parts is equally complicated and often causes irreparable damage to units, hardware, or both.

Therefore, many products labeled and sold as modular are often only assembled once; into a permanent fixed product, thus negating important features and benefits of a modular system. Additionally, rigid material modular units are often bulky, heavy, or both; and may require costly manufacturing equipment and processes, packaging, and freight.

Flexible and semi-rigid materials such as fabric, vinyl, plastics, rubber, paper, mesh, composites, and leather are commonly converted into a multitude of consumer and industrial products and applications such as quilts, clothing, and home decor by cutting patterned shapes by hand or machine and permanently fastening the cut pieces together by sewing, heat or laser welding, or adhesives.

Accordingly, flexible and semi-rigid materials are not commonly made with a modular system. For example, many quilters and crafters typically cut and machine sew hundreds of squares, triangles, and other shapes to produce one single quilt or wall hanging. However, once sewn together, the pieces cannot be separated without damage, reconfigured, or reassembled into a different size, shape, pattern, or function.

Some other modular systems in present use employ jigsaw puzzle type pieces; stacking-type construction pieces with peg-in-hole components; magnetic shapes that attract each other; rubber bands wrapped around pieces to connect; or other methods that can be separated and reconfigured, but these assemblies do not typically have a secure system of connection and can pull apart or collapse with relatively low level force. Therefore, the range of products and applications that can be created and the integrity of construction are significantly limited.

Therefore, there is a need for a modular connection system that allows for the connection of multiple modular units into two dimensional and three dimensional products using a secure but separable connection system.

SUMMARY OF THE INVENTION

It is therefore an object to provide a system and method for producing and assembling flexible, semi rigid, and rigid modular units into two dimensional and three dimensional products and applications;

It is yet another object to provide a secure connection of units that will not pull apart and where the connection system does not require tools, hardware, sewing, welding, or adhesives to adjoin units to each other.

It is yet another object to provide a system of modular connection where units can be separated without damage and can be rearranged, and reassembled into other products and applications of differing size, shape, complexity, or function, or alternatively, can be assembled for optional permanent fixed use.

These and other objects are achieved by providing a system for modular connection having a plurality of modular units. The modular units include a body portion having at least two verticies and a perimeter and a plurality of loop sections extending from the body portion. Each loop section has a distal edge, a void and at least one side edge. A plurality of edge sections are adjacent to the loop sections and the loop and edge sections alternate around the perimeter. The at least two verticies have a loop section and an edge section adjacent thereto and an elongated connection member is adapted to pass through the void in the plurality of loop sections to connect at least two modular units. The loop sections are adapted to align with the edge sections so that a loop section of one of the plurality of modular units is adjacent to a loop section of another one of the plurality of modular units. A connection interface is located in an area proximate to a vertex of at least three of the plurality of modular units where a loop of first one of the plurality of modular units is adapted to align parallel to an edge section of a next modular unit and a loop of each next unit is adapted to align parallel to an edge section of the preceding unit. The last of the plurality of modular units surrounding the connection interface is adapted to align parallel to an edge section of the first unit to form said connection interface and the edge section of the first unit is adjacent to the loop section of the first unit. At least one of the elongated connectors passes through the loop sections of the at least three of the plurality of modular units to connect the modular units at the connection interface.

The system may include at least three modular units each having a surface defining a different plane. Further, the connection interface may be located at each vertex of each of the plurality of modular units in order to form a three dimensional arrangement of the plurality of modular units. The vertex may be adjacent to two side sections of at least one the plurality of modular units. The side sections and the vertex may form an acute angle. The elongated connector may be flexible or rigid or made from a material such as wood, plastic, graphite, carbon fiber, fiberglass metal, plastic, nylon, cotton, polyester, leather or wool or combination thereof.

The system may further have at least one of the modular units having a plurality of slits located in and passing through the body portion, the body portion having two sides. The distal edges of the loop sections of another of the modular units are adapted to insert into and through the slits from a first one said two sides. One of the elongated connectors is adapted to pass through the loop sections of the another modular unit to secure the another modular unit to the modular unit having a plurality of slits.

The modular units may be connected to form a substantially closed structure having an inner volume, the inner volume filled with a compressible material to form, for example, a pillow. The compressible material may be, for example, cotton, polyester, down or foam.

Other objects are achieved by providing a system for modular connection having a plurality of modular units. The modular units include a body portion having a perimeter; a plurality of loop sections having a void extending there through, the loop sections extending from the body portion, each loop section having a distal edge; and a plurality of edge sections adjacent to the loop sections, where the loop and edge section alternate around the perimeter. At least one elongated connection member is adapted to pass through the void in the plurality of loop sections to connect at least two modular units. The loop sections are adapted to align with the edge sections so that a loop section of one of the plurality of modular units is adjacent to a loop section of another one of the plurality of modular units. A first wall unit is made of at least one of the plurality of modular units connected together, the first wall unit having two end sections and two flange sections. The loops of each of the end sections are adapted to connect to form a closed loop. At least a second wall unit is made of at least one of the plurality of modular units, the loops and edge sections of the second wall unit are adapted to interlock with the loops and edge sections of one of the two flange sections. The distal edge of a first one of the loops of the second wall unit is adapted to align parallel to a side section of a second one of the loops of the first wall, and the first one of the loops is disposed between a third and a fourth loop, the third and fourth loop extending from the flange section of the first wall section. One of the connection members is adapted to pass through the second, third and fourth loops.

The second wall unit may be substantially round and the first wall unit may be substantially cylindrical in shape when the first and second ends are connected with one of the connection members. The axis defined by a loop section of one of the end sections of the wall unit may be substantially perpendicular to one of the flange sections.

The above objects, features and advantages of the invention will become more readily apparent from the following description, reference being made to the accompanying drawings and photographs.

BRIEF DESCRIPTION OF THE DRAWINGS

FIG. 1 is a top view pattern drawing of a modular unit having a triangular shape prior to the loops being formed.

FIG. 2 is top view drawing of 2 adjoined units of FIG. 1.

FIG. 3 is a perspective view drawing of an assembled Platonic solid, an icosahedrons, composed of 20 triangular units of FIG. 2

FIG. 6 is a top view of a modular unit similar to FIG. 2 before the loops are formed around the perimeter.

FIG. 7 is a top view of a FIG. 6 unit with attached perimeter loops.

FIG. 8 is a top view of 8 adjoined modular units if FIG. 7.

FIG. 13 is a top view of a circular modular unit having loops similar to FIG. 2.

FIG. 13a is a top view of a circular modular unit similar to FIG. 13 with an alternate loop pattern.

FIG. 14 is a perspective view of 2 square modular units adjoined to each other and 1 circular unit of FIG. 13a partially adjoined to the square units.

FIG. 15 is a perspective view of the 2 square units and 1 circular unit of FIG. 14, adjoined together to form a cylinder like form with a closed top and open bottom.

FIGS. 32-33 are top views of modular units similar to FIG. 2, but having an alternate shape.

FIGS. 37-39 are perspective views of the modular units as applied to a tent side wall or window covering.

DETAILED DESCRIPTION OF THE INVENTION

Figure 4:
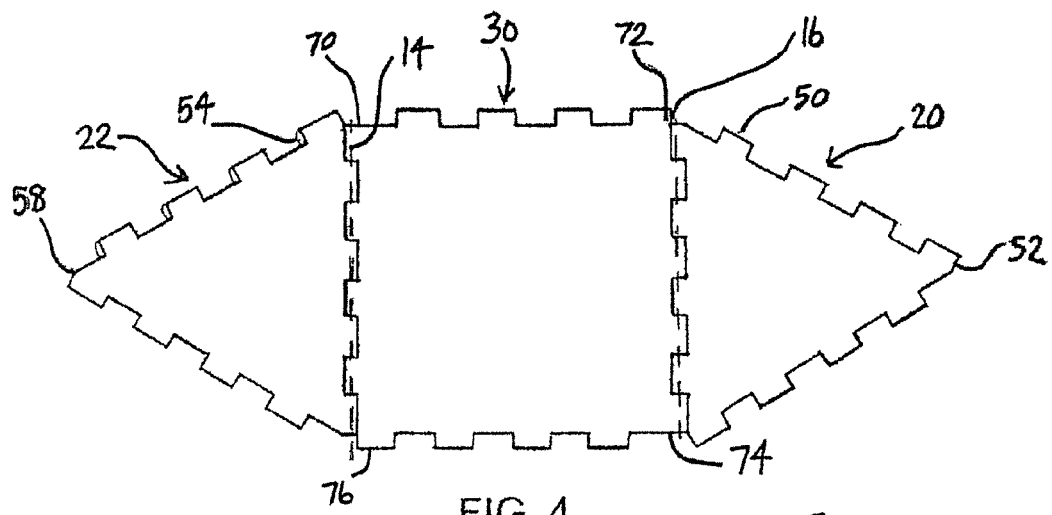
FIG. 4 is a top view of 2 triangular units of FIG. 2 joined with 1 square modular unit.

Modular units can be manufactured in many shapes and sizes, according to the functional and aesthetic demands of the finished product or application. Shapes can be squares, rectangles, triangles, circles, polygons, freeform shapes, or a combination of like or dissimilar shapes. The size and scale of the modular units may be very small to very large.

One aspect includes a system and method of producing improved modular units for use in consumer and industrial applications that include, but are not limited to: banners, flags, signs, awnings and building wraps; architecture, tents, shelters, other enclosures, dividers and barriers; entertainment sets and props, sculpture and art works; display fixtures and trade show exhibits; do it yourself products and ready-to-assemble kits; items of clothing; arts and crafts creations, scrap booking, quilts or quilt-like assemblages in fabric, paper, vinyl, plastic, mesh, or any other natural, synthetic, engineered material or combination of materials; interior and exterior home furnishings, wall coverings, upholstery, window treatments; medical, surgical and healthcare products and applications; marine, boating and water sports; space travel, military, safety, transportation, firefighting and police equipment; tarps and truck covers; environmental and agricultural applications; solar energy and other environmentally friendly products; building construction products; toys, sports, camping and recreational equipment; yard, landscaping, and garden applications; animal and pet products; travel, shipping, storage and transportation applications; office products and supplies; food products and other edible and non-edible creations made by mixing and manipulating ingredients into suitable form; and numerous other products and applications.

These modular units can be assembled and interchanged with like or dissimilar materials, thus allowing for varying material content, texture, pattern, color or other characteristic. For example, modular units produced from sheet vinyl can be attached to textured fabric, rubber, sheet aluminum, plywood, or other suitable flexible, semi-rigid or rigid material.

The modular units can be composed of two or more layers, plies, laminations or embossments of like or dissimilar materials. This can increase aesthetic appearance, strength, compatibility to other materials, water repellency, buoyancy, fire resistance, ultra-violet resistance, mechanical resistance, abrasion resistance, hydro carbon resistance, resistance to extreme conditions, any combination of the above or combination of other effects accomplished by a multi-ply composition.

The modular units are optionally capable of being folded, rolled, stacked, or compressed for packaging, merchandising, shipping or storage, either as a number of units prior to assembly or, as an already assembled multi-unit product, according to the nature and properties of the materials or materials used to produce the modular units, and product specifications.

The units can be produced from postconsumer recycled content materials; bio-degradable materials; or other advanced technology such as: materials used in medical applications that dissolve into or off of the body; materials used in environmental applications where biodegradability is advantageous; solar-energy collecting materials; and repurposed materials such as previously used vinyl signs, banners and building wraps, tents and tarps, billboards, and many others.

The units can be produced from materials such as natural animal, plant and mineral substances that can be combined with manufactured materials or used on their own. For example leaves, grasses, seaweed, or clay; or, animal, plant and mineral products that can be mixed, formed, rolled, flattened, dehydrated, sliced, sawn, or otherwise processed to attain a suitable material such as flour made into dough, pie crust, tortilla, wonton; or any other material or mixture of materials capable of conversion into modular units.

Provides improved modular units that may optionally incorporate fittings, accessories, hardware, embellishments, electronics, or other parts or materials such as wheels, pulleys, chains, weights, turnbuckles, rings, rope lighting, electrical wiring, electronics, straps, beads, charms, feathers or other functional or aesthetic items.

FIG. 1 is a top view pattern of a modular unit 20 in the shape of an equilateral triangle during manufacture. The edge 7 of the unit 20 is folded over towards the center of the body and affixed to the body to create loops.

FIG. 2 shows two modular units 20, 22 with interlocking loop sections along one edge. An elongated connector 10 can pass through the loop sections along an axis 12, where the axis is defined by the voids of the loops. The body 5 of the modular unit has loop sections with a distal edge 50, a side edge 52 and a void 54. Adjacent to each loop section is an edge section 56, and the loop and edge sections alternate around the perimeter such that the loops of multiple modular units can interlock and be joined with the elongated connector 10. The modular units in FIG. 2 have vertexes 58, 60, 62 with an edge section adjacent to the vertex on one side, and a loop section adjacent to the vertex on the other side.

FIG. 3 is a perspective view of one embodiment of a connection interface 64 where multiple modular units are adjoined together to create a three-dimensional structure. Modular units 20, 22, 24, 26, 28 surround the connection interface 64 such that a vertex of each modular unit is within an area proximate to the connection interface and the edge and loop sections of the vertex interlock in an alternating fashion around the connection interface. For example, edge section at the vertex of modular unit 20 interlocks with the loop section of modular unit 22 at the vertex that is proximate to the connection interface. Edge section of the modular unit 22 interlocks with the loop section of modular unit 24 at the respective vertices that are proximate to the connection interface. This interlocking repeats around the connection interface so that the final modular unit 28 has an edge section that interlocks with the loop section of modular unit 20, where the edge section and loop section are at the respective vertices proximate to the connection interface.

FIG. 4 shows two modular units 20, 22 each having three vertices, connected along two axis 14,16 to one modular unit 30 having four vertices 70, 72, 74, 76. The modular units 20, 22 are compatible and interlock with modular unit 30, a dissimilar shape unit.

Figure 5:
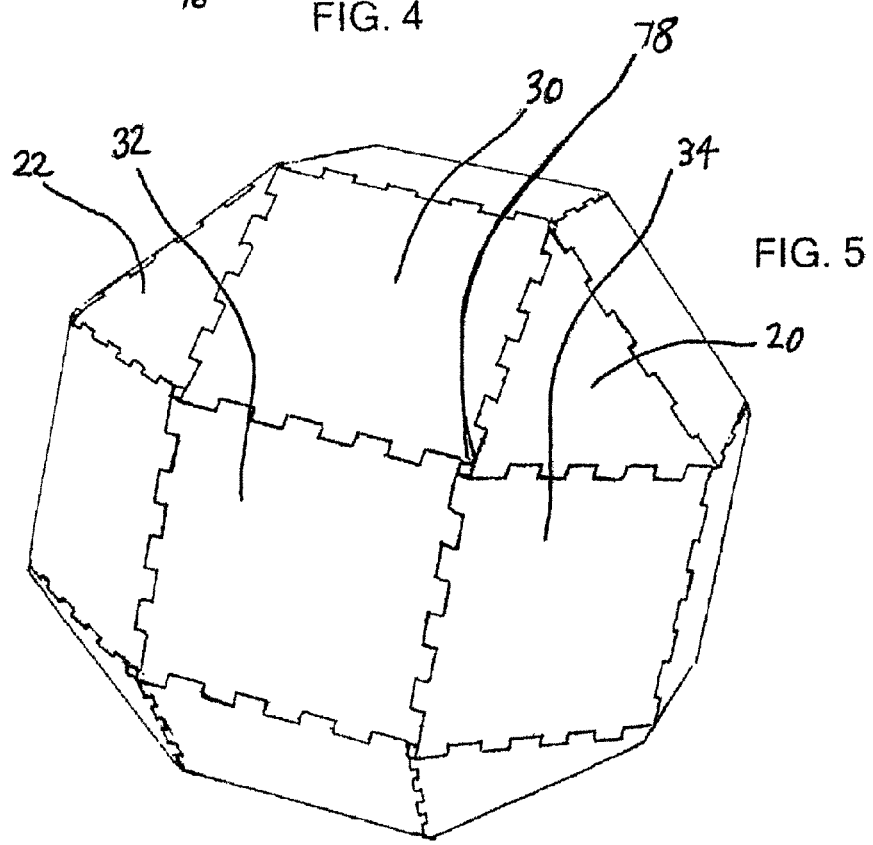
FIG. 5 is a perspective view of an assembled Archimedean solid, composed of 8 triangular units of FIGS. 2 and 18 square modular units.

FIG. 5 illustrates one embodiment of the connection of similar and dissimilar modular units 20, 22, 30 where multiple modular units are joined together to create a three-dimensional structure. Modular units 20, 30, 32, 34 surround the connection interface 78 such that a vertex of each modular unit is within an area proximate to the connection interface and the edge and loop sections of the vertex interlock in an alternating fashion around the connection interface.

FIG. 6 is a top view of a modular unit 110 during the manufacturing process, which is similar to the modular unit shown in FIG. 1. Modular unit 110 may have loops of smaller dimensions where the side edges 42 of some of the loop sections are smaller than the side edges 44 of others of the loop sections. FIG. 7 is a top view of modular unit 110 once the loops have been formed.

FIG. 8 is a top view of one embodiment of a connection interface where multiple modular units are adjoined together to create a two-dimensional structure. Modular units 110, 112, 114, 116, 118, 120, 122, 124 surround the connection interface 130 such that a vertex of each modular unit is within an area proximate to the connection interface and the edge and loop sections of the vertex interlock in an alternating fashion around the connection interface. An elongated connector 15 can pass through the loop sections along an axis 13, where the axis is defined by the voids of the loops.

Figure 9:
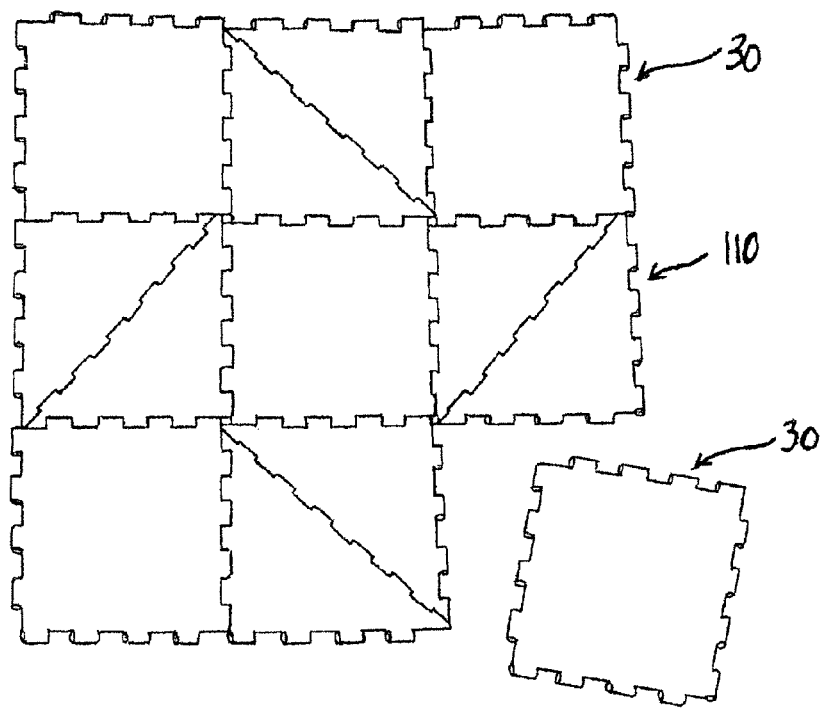
FIG. 9 is a top view of 8 modular units of FIG. 7 adjoined with 3 square modular units and 1 square modular unit in proximity to be adjoined.

FIG. 9 is a top view of an embodiment of the improved modular units showing eight modular units 110 of FIG. 7 adjoined to three modular units 30 of FIG. 4 to create a two-dimensional structure with one additional modular unit 30 illustrated but not yet adjoined to the structure.

Figure 10:
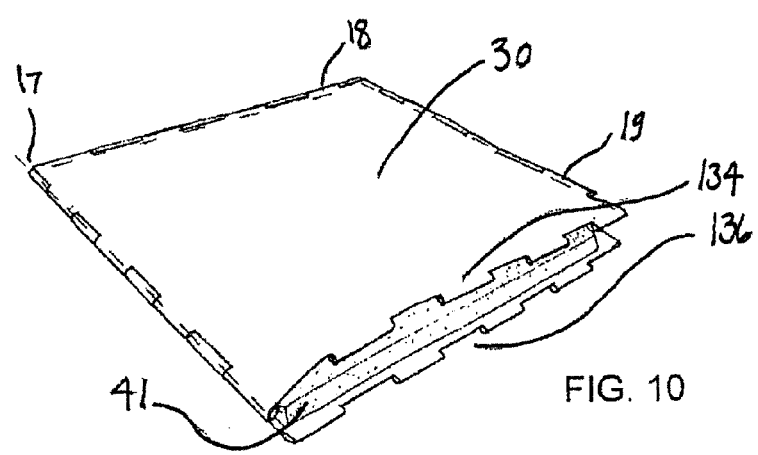
FIG. 10 is a perspective view of 2 square modular units partially adjoined around the perimeter of both and having a inner soft material such as a layer of foam rubber.

FIG. 10 is a perspective view of an embodiment showing two modular units 30 adjoined along three axis 17, 18, 19. Two sides 134, 136 comprising a fourth axis are not adjoined. A material such as foam rubber 41 is shown inserted into the cavity between the two modular units 30.

Figure 11:
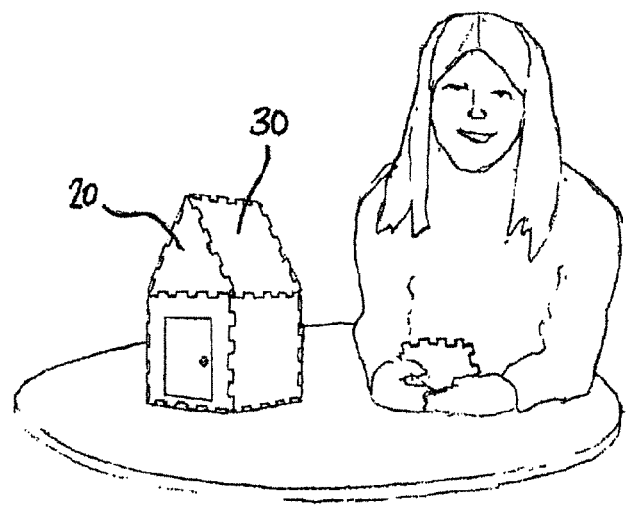
FIG. 11 is a perspective view of modular units similar to FIG. 2 adjoined in the shape of a small scale architectural structure.

FIG. 11 is a perspective view of an embodiment of improved modular units showing multiple units 20, 30 adjoined to create a three dimensional structure resembling a birdhouse.

Figure 12:
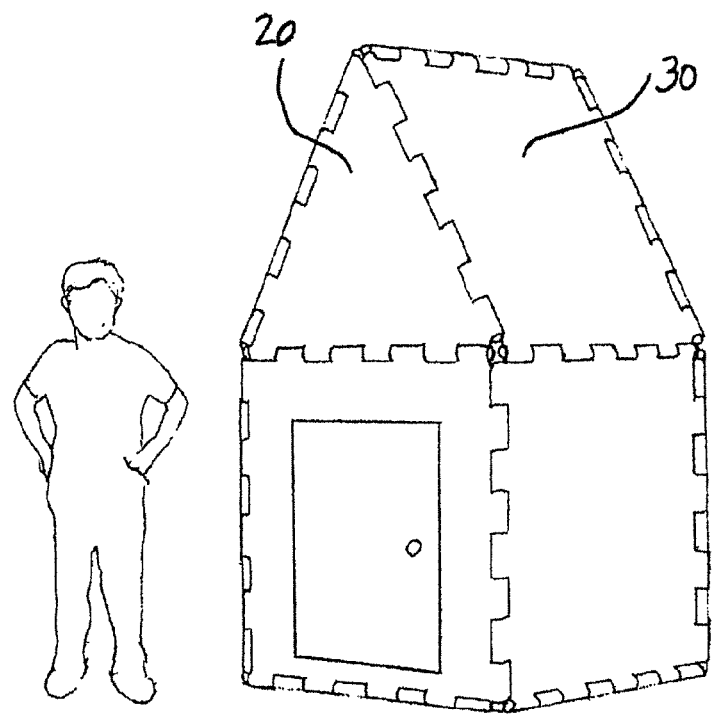
FIG. 12 is a perspective view of modular units similar to FIG. 2 adjoined in the shape of a larger scale architectural structure such as a playhouse.

FIG. 12 is a perspective view of an embodiment of improved modular units showing the same shape and configuration of units 20, 30 of FIG. 11 in a larger scale, adjoined to create a three dimensional structure such as a child's play house.

FIG. 13 is a top view of a modular unit 90, having alternating loop sections 92 and side sections 94 around the circumference of a circle. Loop section 96 is shown secured to the base along line B-B with a suitable method such as sewing, heat fusing, adhesive or other.

FIG. 13a is a top view pattern drawing of a modular unit 91 having alternating loop sections 98 and side sections 94 and in a circular configuration. Loop sections 98 show enlarged material portions at the end of each loop section to provide increased area for securing the loops with suitable methods or materials such as adhesive tape, hook and loop fastener, liquid adhesive, or other. The shape of the enlarged loop may be altered to suit the product or application.

FIG. 14 shows a first wall section 140 that is made of two modular units 142, 144. The modular units 142, 144 are joined at end sections 150 and 148. A modular unit 90 is joined to the loops and edges of the flange section 156. A loop section 96 of the modular unit 90 interlocks between two loop sections 160, 162 of the flanges 156, 158. A side section of loop 164 is in contact with the distal edge of loop 96. As shown in FIG. 14, the elongated connector 100 is a string, although one of skill in the art would understand that ropes, wires, plastic straps, strings and various other materials may be used depending on the application.

FIG. 15 further illustrates the embodiment of FIG. 14, showing modular units 90, 142 and 144 adjoined forming a three dimensional cylinder shape with a closed top. The elongated connector 100 is shown optionally tied to secure the connection of units.

Figure 16:
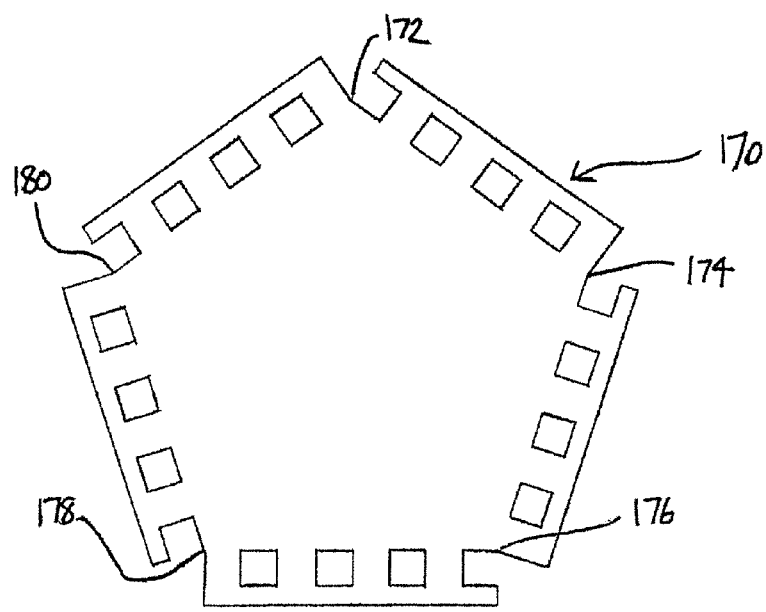
FIG. 16 is a top pattern view of a modular unit similar to FIG. 1, but in a pentagon shape prior to assembly.

FIG. 16 is a top view pattern drawing of a modular unit during assembly and in the form of a five sided shape or pentagon 170, having five vertices 172, 174, 176, 178, 180.

Figure 17:
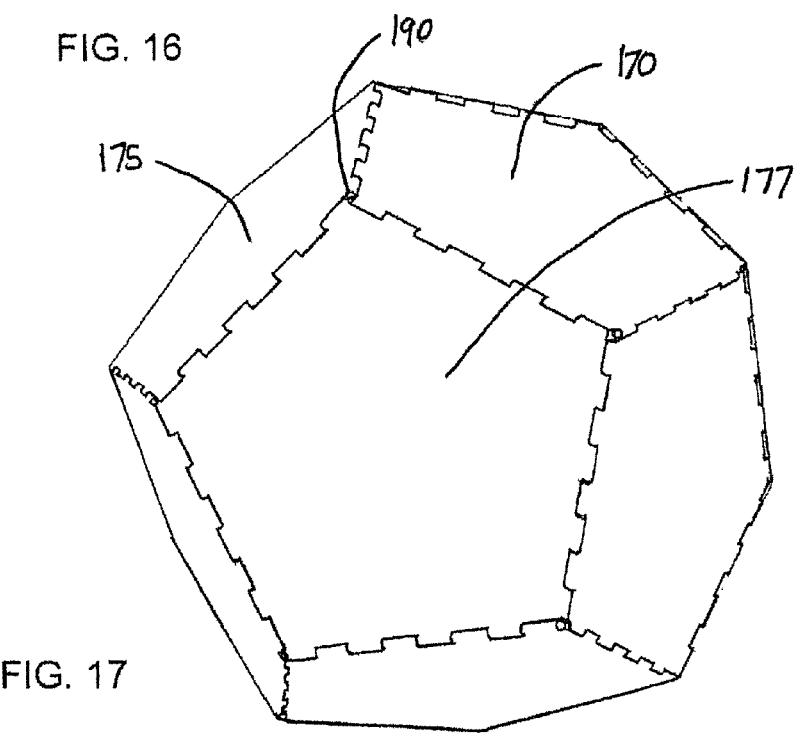
FIG. 17 is a perspective view of a Platonic Solid dodecahedron composed of 12 adjoined pentagon units of FIG. 16.

FIG. 17 is a perspective view of one embodiment of multiple modular units 170 adjoined to create a three dimensional structure. Modular units 170, 175, 177 surround the connection interface 190 such that a vertex of each modular unit is within an area proximate to the connection interface and the edge and loop sections of the vertex interlock in an alternating fashion around the connection interface having three vertices at each connection interface.

Figure 18:
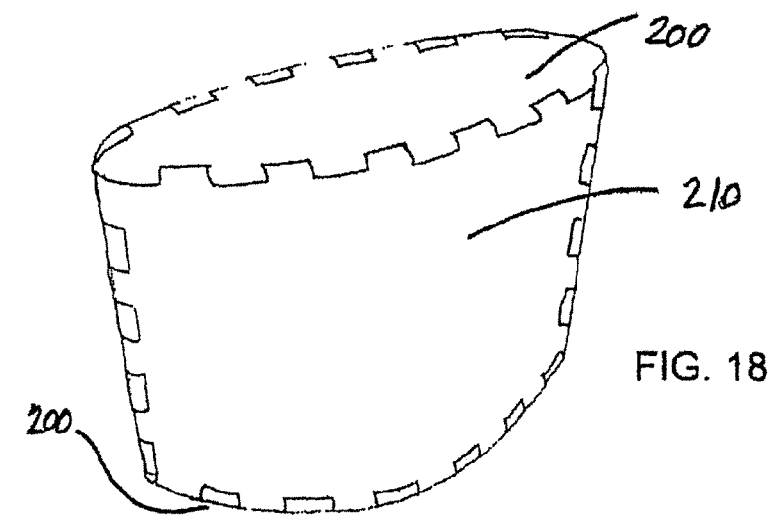
FIG. 18 is a perspective view of an alternate assembly of modular units similar to FIGS. 13-15.
Figure 19:
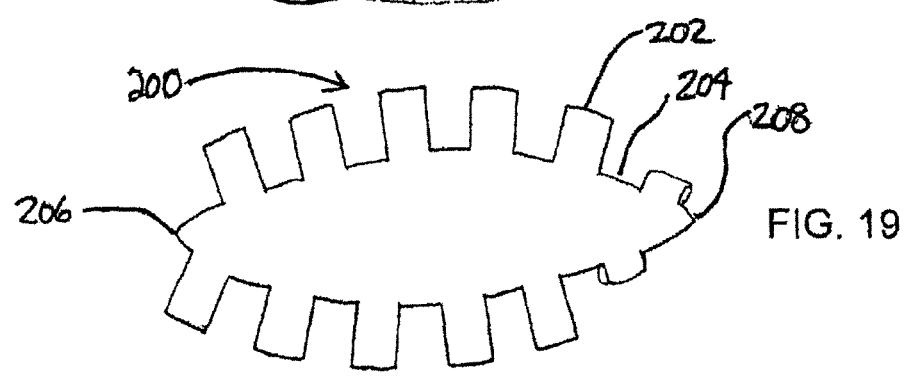
FIG. 19 is a top view of one of the modular units shown in FIG. 18.
Figure 20:
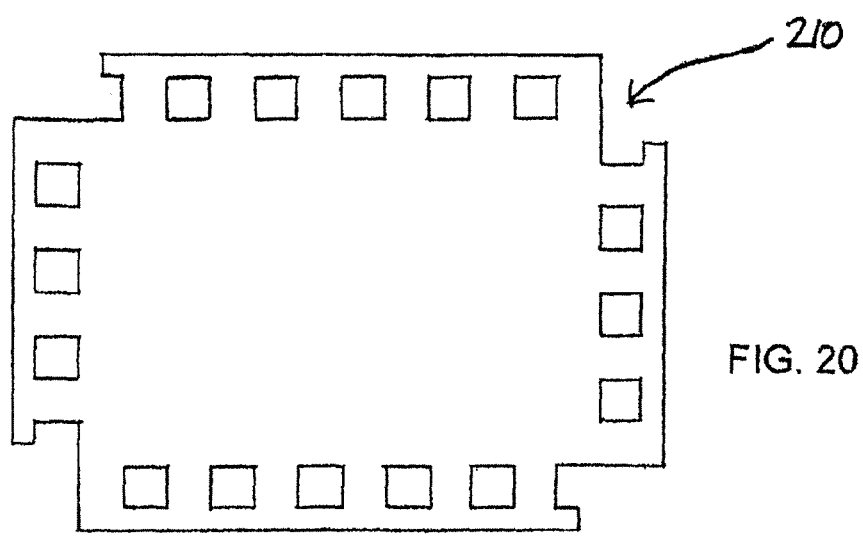
FIG. 20 is a top view of a rectangular modular unit shown in FIG. 18 before the loops are formed therein.

FIG. 18 is a perspective view of one embodiment adjoining two modular units 200 of FIG. 19 and two modular units 210 of FIG. 20 to create a three dimensional structure composed of dissimilar shapes resembling a closed container.

FIG. 19 is a top view of a modular unit 200 having two vertices 206, 208 and curved sides. The perimeter of modular unit 200 is comprised of loops 202 and edge sections 204 alternating around the perimeter such that the loops can interlock and adjoin with other similar and dissimilar units. Vertices 206 and 208 have an edge section adjacent to the vertex on each side, but may alternately be formed with an edge section adjacent to the vertex on one side, and a loop section adjacent to the vertex on the other side.

FIG. 20 is a top view of a modular unit 210 in the shape of a rectangle.

Figures 21, 22, 23:
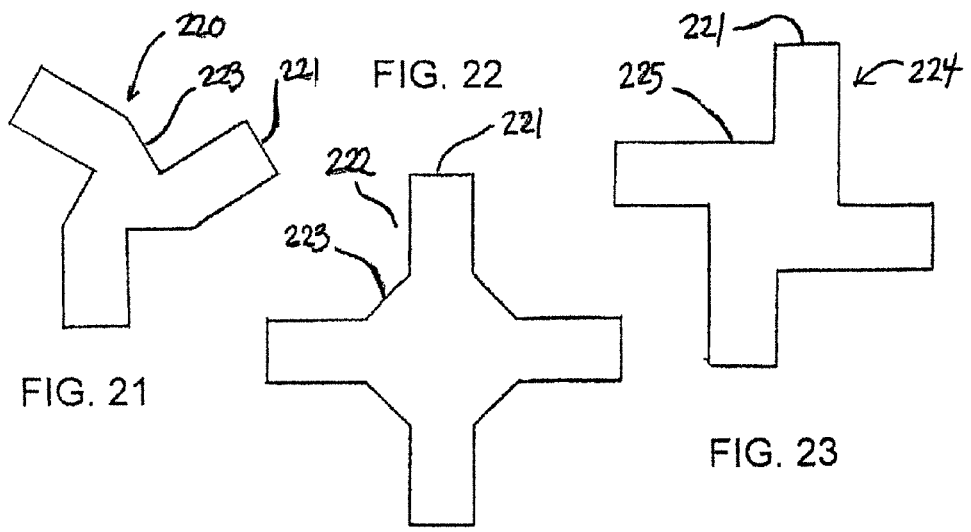
FIGS. 21-23 are top views of alternate shapes of modular units similar to FIGS. 1 and 2.

FIG. 21 is a top view of a modular unit 220 that when loops are formed by bonding a section proximate to the edges of the loops 221 to the body, the modular unit 210 will resemble an equilateral triangle having three loops and three edge sections 223.

FIG. 22 is a top view of a modular unit 222 that when assembled by bonding a section proximate to the edges of the loops 221 to the body, the modular unit 222 will resemble an octagon having four loops and four edge sections 223.

FIG. 23 is a top view of a modular unit 224 that when the loops are formed by bonding a section proximate to the edges of the loops 221 to the body, the modular unit 224 will resemble a square having four loops and four edge sections 225.

Figure 24:
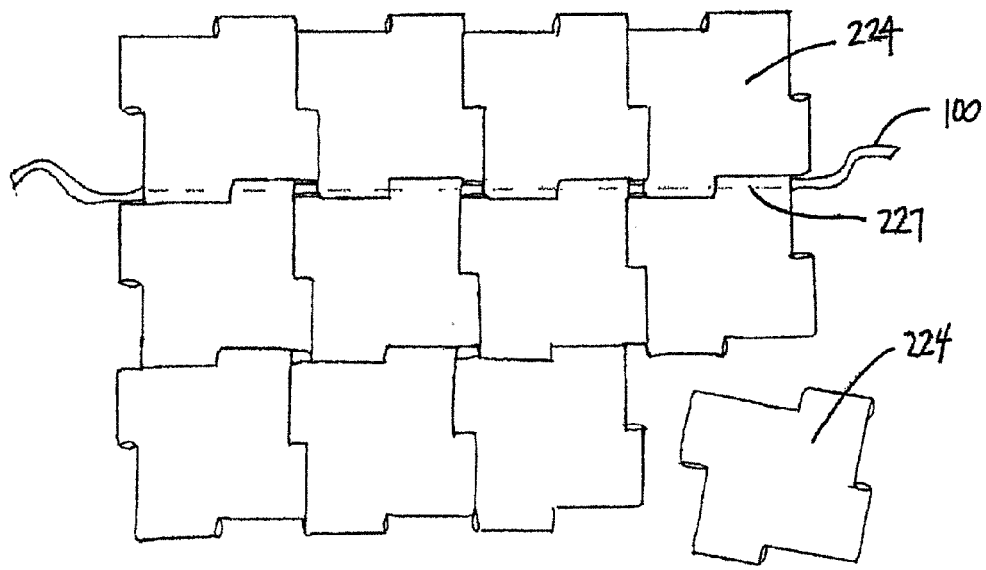
FIG. 24 is a top view of an assembly of modular units shown in FIG. 23.

FIG. 24 is a top view of one embodiment of adjoined modular units comprising eleven modular units 224 of FIG. 23 adjoined thru axis 227 with an elongated connector 100. One additional compatible modular unit 224 is illustrated, but not yet adjoined.

Figure 25:
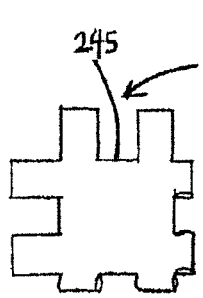
FIGS. 25-29 is a top view of modular units similar to FIG. 2 for assembly in a concentric arrangement.

FIG. 25 is a top view of a modular unit 240 having loop sections positioned adjacent to both sides of each vertex, and an edge section 245 between loop sections on all four perimeter sides of the unit.

Figure 26:
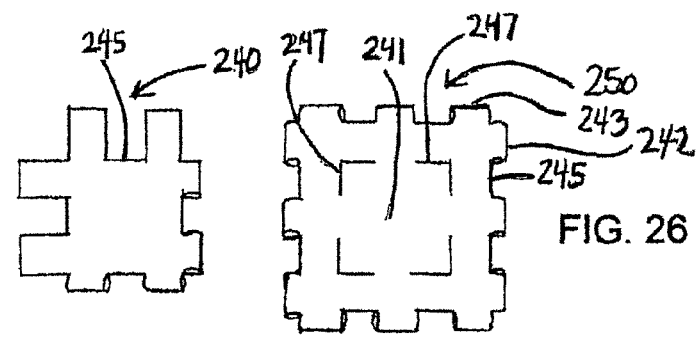

FIG. 26 is a top view of modular units 250 having loop sections 242, 243 positioned adjacent to both sides of each vertex, and loop and edge sections 245 alternating between vertex loops. The body 241 has perforations or slits 247 located so that the loops of modular unit 240 of FIG. 25 can be inserted into and through the slits 247 of unit 250.

Figure 27:
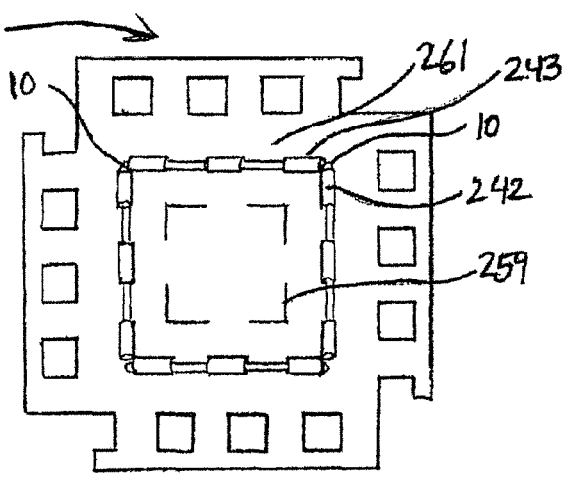

FIG. 27 is a top view illustrating the method of adjoining a FIG. 26 modular unit 250 to the body 261 of modular unit 260 by inserting the loops 242 through the slits in body 261 and employing elongated connectors 10 to secure the loops.

Figure 28:
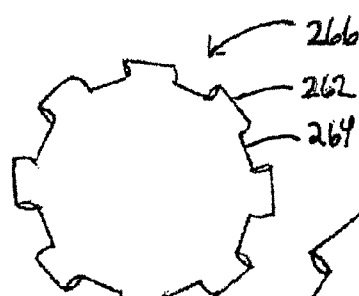

FIG. 28. Is a top view of a circular modular unit 266 having alternating loop sections 262 and edge sections 264 around the entire perimeter.

Figure 29:
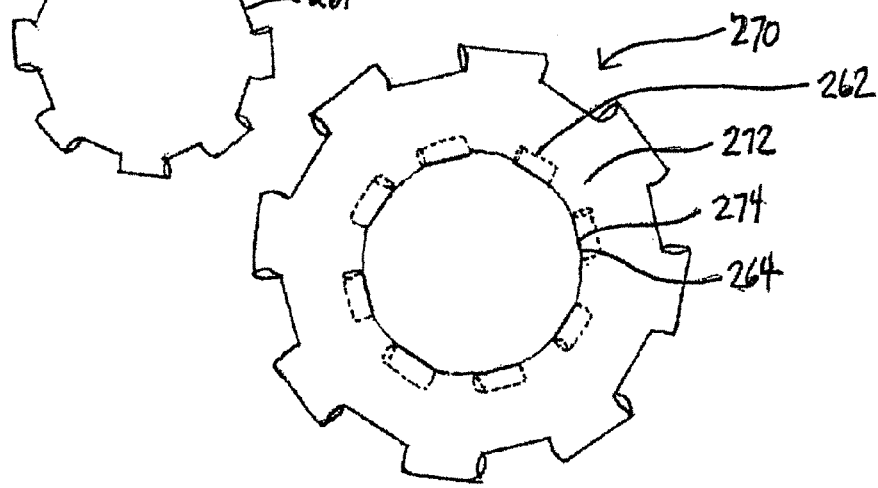

FIG. 29 is a perspective view illustrating the circular modular unit 266 of FIG. 28 adjoined to the larger circular modular unit 270 using the method similarly described in FIGS. 25-27. The body 272 having perforations or slits 274 located so that the loops 262 may be inserted through the slits and an elongated connector may be inserted through the loops to secure modular unit 266 to modular unit 270.

Figure 30:
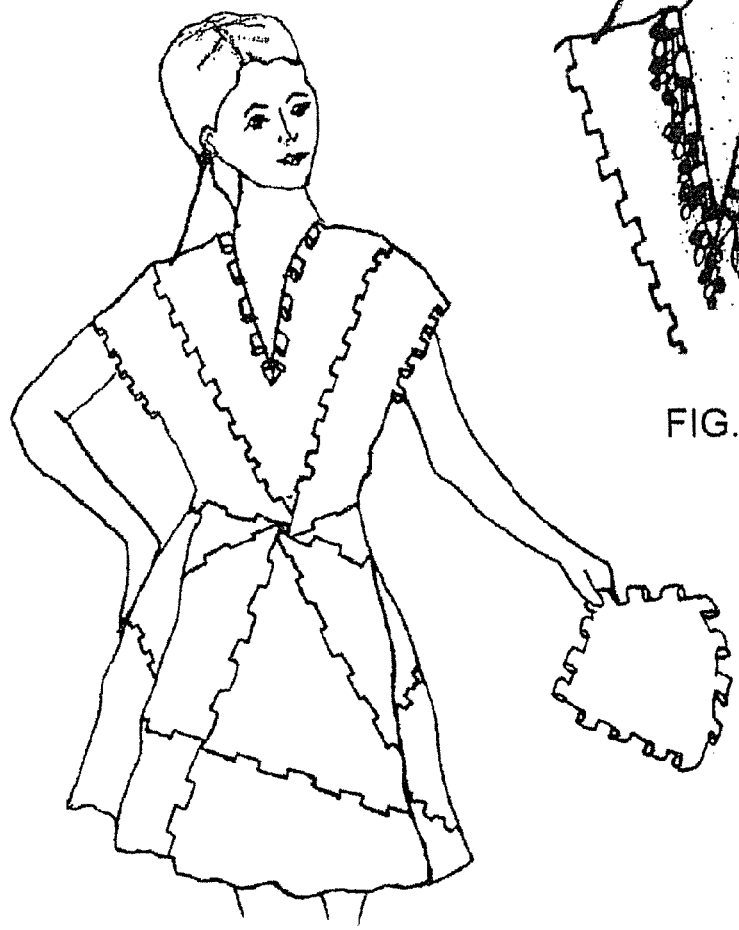
FIGS. 30-31 are perspective views of modular units similar to FIG. 2 assembled to form a dress.

FIG. 30 is a perspective view of multiple modular units adjoined to form an article of clothing.

Figure 31:
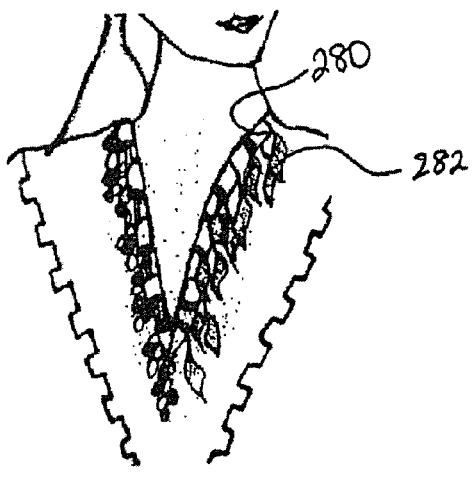

FIG. 31 is a detail perspective view of FIG. 30 showing unattached loops 280 having an embellishment 282 secured thereto. The embellishment can be a number of decorative items such as such as beads, feathers, rings, clips, etc. It is contemplated that other shapes of modular units can be used to alter the appearance of the dress, and numerous embellishments can be used.

FIGS. 32, 32a are top views of modular units 290 having a free form shape. The perimeter of modular unit 290 is comprised of loops 292 and edge sections 294 alternating around the perimeter such that the loops can interlock and adjoin with other similar and dissimilar units. Vertices 296 and 298 have an edge section adjacent to the vertex on one side, and a loop section adjacent to the vertex on the other side.

FIG. 33 is a top view of two modular units 290 illustrating a method of adjoining modular units having irregular, free form, non-geometric shape using an elongated connector 100.

Figure 34:
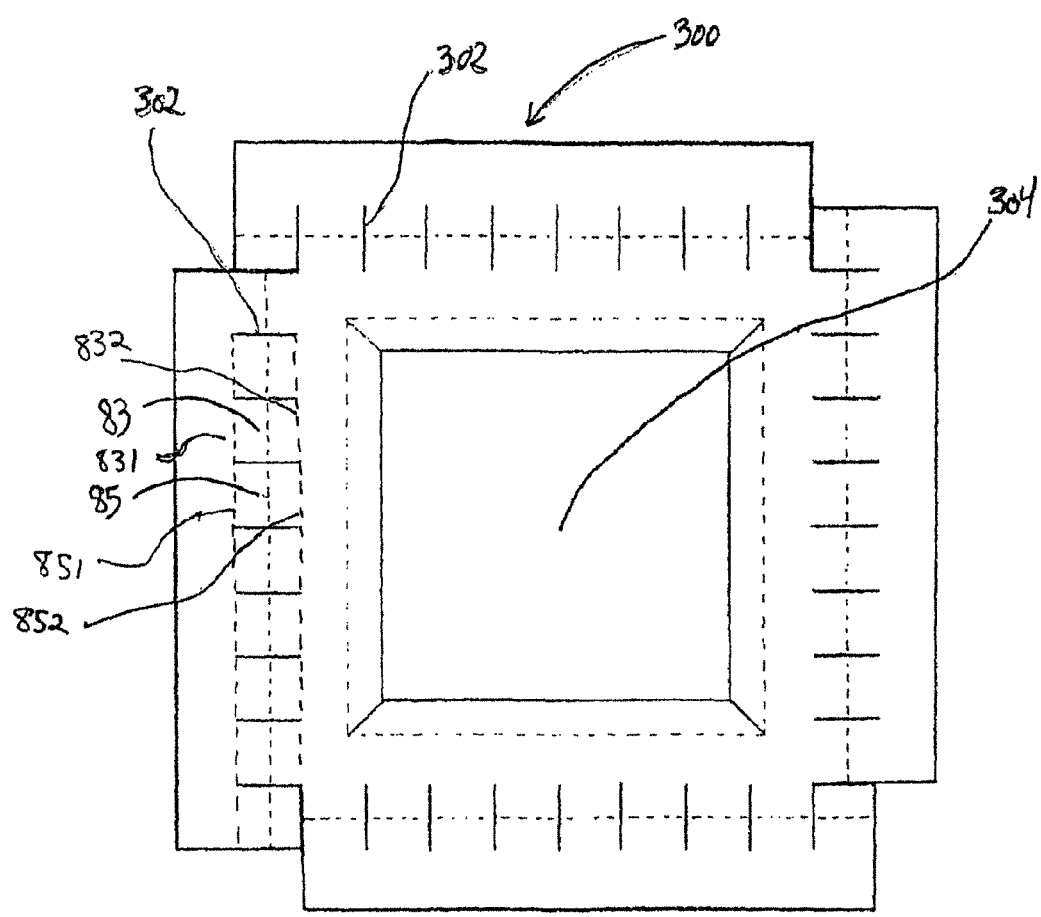
FIGS. 34-36 are top views of modular units similar to FIG. 2, but in an alternate configuration.

FIG. 34 is a top view pattern of a system and method of producing modular units 300 using slits or cuts 302 through a suitable material whereupon the material between the slits is folded to form loops that alternate front to back. For example, section 83 would be pushed into the page to form a back side loop and section 85 would be pulled forward to form a front side loop. The loops can be made permanent by securing the bases of the loops 831, 832, 851, 852 to each other by a suitable method such as sewing, electronic welding or other. Additionally, the body 304 of modular unit 300 can be left solid or a portion of material removed and manipulated to form an integrated frame or casing, further illustrated in FIG. 35, 36. This system and method can also produce other embodiments with other size and feature variations.

Figure 35:
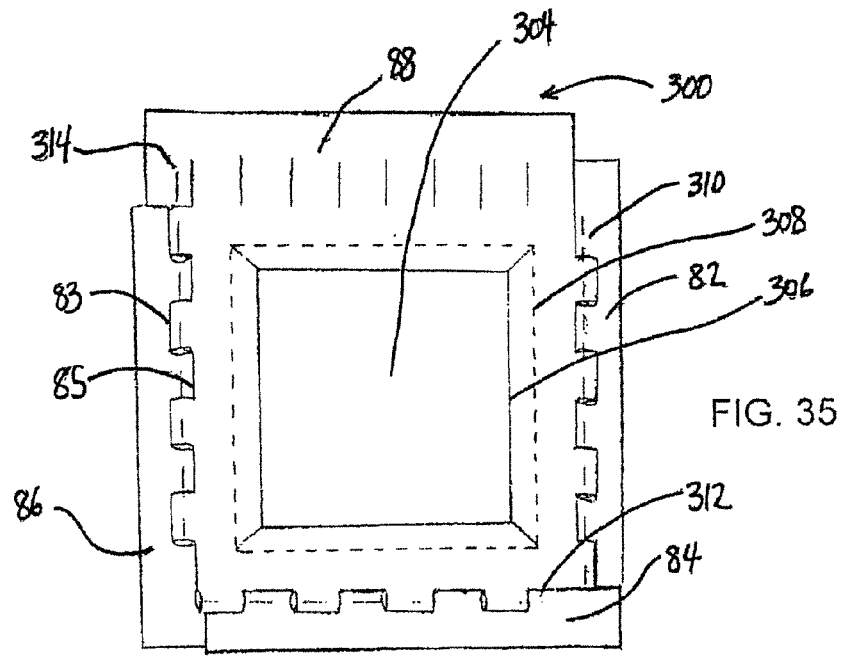

FIG. 35 is a perspective view of an embodiment of the system and method described in FIG. 34 showing three lateral sides 82, 84, 86 of modular unit 300 with loops 83 folded, configured, and adjoined by suitable means along axis 310, 312, 314. A fourth side 88 is shown prior to folding, configuring, and adjoining the alternating loop sections to the body. What is formed is one complete set of perimeter loops and apertures on one side of the modular unit and a second complete set of perimeter loops and apertures on the reverse side of the modular unit. This system enables two or more separate, compatible secondary modular units to be adjoined on each side of the primary unit. Additionally, the body 304 of the primary unit can be left solid as shown, or a portion of body material removed and manipulated to form an open area, window, or other application further illustrated in FIG. 36. This method can also produce other embodiments and other size and feature variations.

Figure 36:
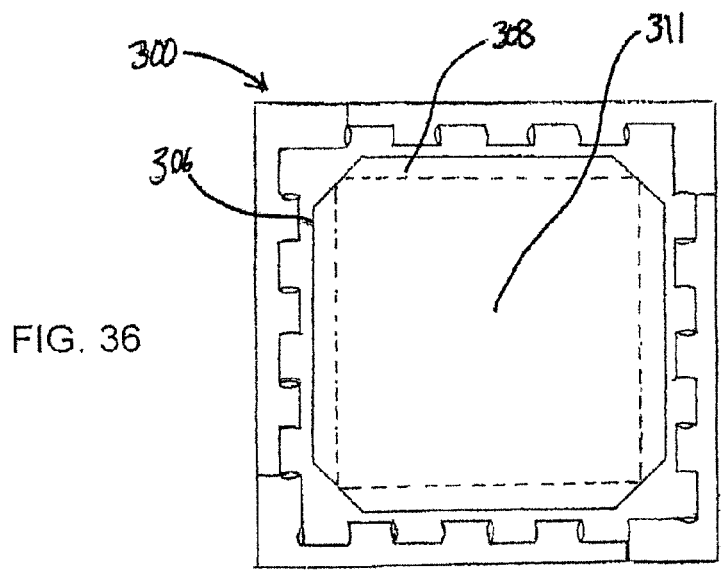

FIG. 36 is a perspective view of the reverse side of modular unit 300 of FIG. 35, having all four sides completed, and showing the second set of interior perimeter loops. The center of body 304 has been cut along solid line 306, folded along broken line 308, and secured with a method such as adhesive, sewing, heat welding, or other suitable method, thus forming a frame or casing around the perimeter of the opening. The resulting open area 311 allows light and air to pass through the modular unit and optionally enables light and air to pass through a translucent, mesh, or other material.

Figure 37:
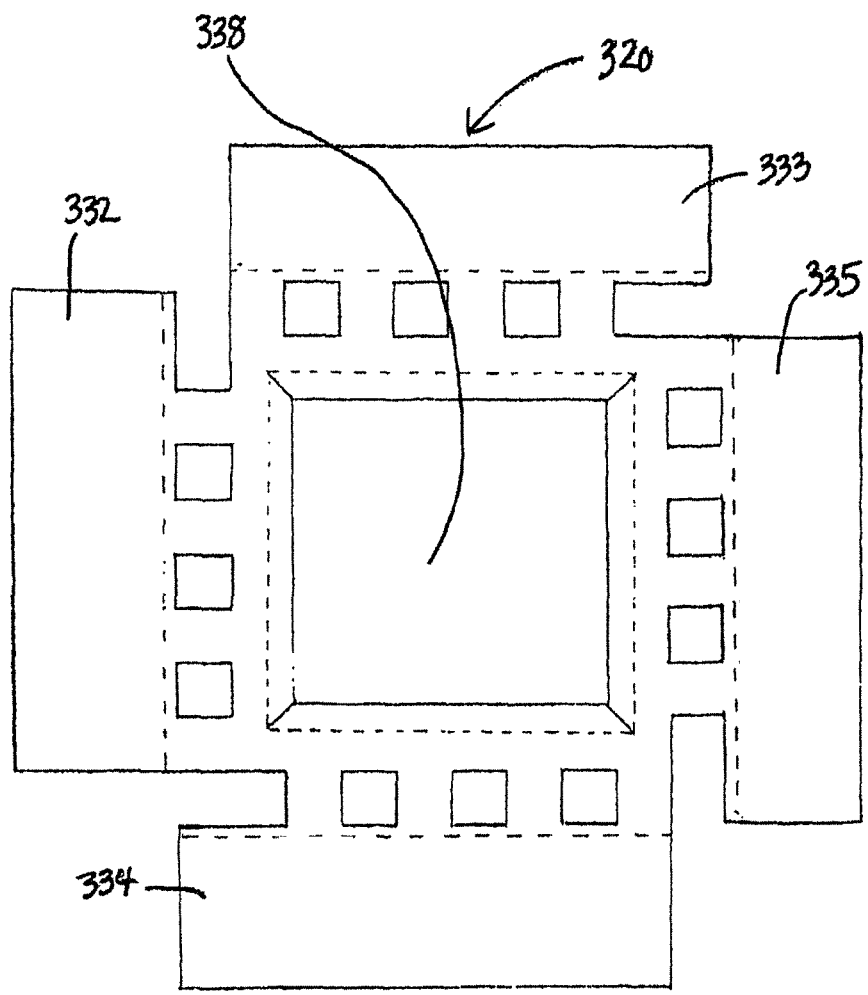

FIG. 37 is a top view pattern of a system of producing modular units 320 having a panel like shape similar to and compatible with modular unit 30 with an added system of integral flanges or eave areas that extend and overlap the adjoined loop sections of assembled units. The pattern shows wider width flanges 332, 334 on left and bottom sides, and narrower width flanges, 333 and 335 on right and top sides. Additionally, the body 338 of the primary unit can be left solid as shown, or a portion of body material removed and manipulated to form an open area, window, or other application further illustrated in FIG. 38, 39. This method can also produce other embodiments and other size and feature variations FIG. 38 is a perspective view of three assembled modular units 320, 322, 324 adjoined to each other with elongated connectors, 10. A secondary modular unit 30 is attached to unit 324 at axis 360 using an elongated connector, 10 and is shown rolled up to expose the open or window area 328 of unit 324. Modular units 320 and 322 show unattached loops 340 available for adjoining additional modular units.

FIG. 39 is a perspective view of the reverse side of modular units 320, 322, 324, and showing wider width flange overlapping eave section 332 opened out to reveal flange section 335, the elongated connector 10 and connected loops within the assembly.

The terms "first", "second", "third", "fourth" etc are used to distinguish one element, set, data, object or thing from another, and are not used to designate relative position or arrangement in time. The terms "left", "right", "front" and "back" are used to distinguish one location, part of thing from another and are not used to designate a specific arrangement or point of view required, since, for example, the "front" in one point of view could be the "back" from a different point of view.

One of skill will understand and appreciate the existence of variations, combinations, and equivalents of the embodiments, systems, methods and examples herein. Therefore, the scope of the present invention should not be limited by the embodiments described herein.

What is claimed is:

1. A system for modular connection comprising:
    a plurality of modular units, each comprising:
        a body portion having at least two vertices and a perimeter;
        a plurality of loop sections extending from said body portion, each loop section having a distal edge, a void and at least one side edge;
        a plurality of edge sections adjacent to said plurality of loop sections wherein the plurality of loop sections and the plurality of edge sections alternate around the perimeter;
        wherein each of the at least two vertices of each of the plurality of modular units has one of the plurality of loop sections and one of the plurality of edge sections adjacent thereto;
    at least one elongated connection member is adapted to pass through the void in the plurality of loop sections to connect at least two modular units wherein the plurality of loop sections are adapted to align with the plurality of edge sections so that one of the plurality of loop sections of one of the plurality of modular units is adjacent to one of the plurality of loop sections of another one of the plurality of modular units; and
    a connection interface located in an area proximate to a vertex of at least three of said plurality of modular units wherein one of the plurality of loop sections of a first one of the plurality of modular units is adapted to align parallel to one of the plurality of edge sections of a next modular unit and one of the plurality of loop sections of each next unit is adapted to align parallel to one of the plurality of edge sections of a preceding unit, wherein the connection interface includes an opening at the connection interface and is closed in a location extending radially outwards from the opening;
    wherein one of the plurality of loop sections of the last of the plurality of modular units surrounding the connection interface is adapted to align parallel to one of the plurality of edge sections of the first unit to form said connection interface and the one of the plurality of edge sections of the first unit is adjacent to the one of the plurality of loop sections of the first unit;
    wherein the at least one elongated connection member passes through the plurality of loop sections of said at least three of said plurality of modular units to connect the modular units at said connection interface.

2. The system of claim 1 wherein each of said at least three modular units has a surface defining a different plane.

3. The system of claim 1 wherein the connection interface is located at each vertex of each of said plurality of modular units in order to form a three dimensional arrangement of said plurality of modular units.

4. The system of claim 1 wherein said vertex is adjacent to two side sections of at least one said plurality of modular units, said two side sections and said vertex forming an acute angle.

5. The system of claim 1 wherein said elongated connection member is made of a material selected from the group consisting of: wood, plastic, graphite, carbon fiber, fiberglass and metal.

6. The system of claim 1 further comprising:
at least one said plurality of modular units having a plurality of slits located in and passing through the body portion, the body portion having two sides;
wherein the distal edges of the loop sections of another one of said plurality of modular units is adapted to insert into and through the plurality of slits from a first one said two sides; and
wherein one said elongated connection members is adapted to pass through the loop sections of said another modular unit to secure said another one of said plurality of modular units to said at least one said modular units having a plurality of slits.

7. The system of claim 1 wherein said elongated connection member is flexible.

8. The system of claim 7 wherein said elongated connection member is made of a material selected from the group consisting of: plastic, nylon, cotton, polyester, leather and wool.

9. The system of claim 1 wherein the plurality of modular units are connected to form a substantially closed structure having an inner volume, the inner volume filled with a compressible material to form a pillow.

10. The system of claim 1 wherein at least two of the plurality of modular units are of different shapes.

11. A system for modular connection comprising:
a plurality of modular units configured to connect together along their respective edges to create a three dimensional structure, each of said plurality of modular units comprising:
  a body portion having a perimeter, wherein the body portion is planar and the perimeter defines a plurality of side sections, each of the plurality of side sections between two vertices;
  a plurality of loop sections having a void extending there through, said loop sections extending from said body portion, each loop section having a distal edge;
  a plurality of edge sections adjacent to said plurality of loop sections;
  wherein the plurality of loop sections and the plurality of edge sections alternate around the perimeter such that each of the plurality of side sections includes at least two of the plurality of loop sections and each one of the two vertices is located between two of the plurality of side sections such that one of the plurality of loop sections is adjacent to a first one of the two vertices along a first one of the two of the plurality of side sections and one of the plurality of edge sections is adjacent to the first one of the two vertices along a second one of the two of the plurality of side sections;
at least one elongated connection member is adapted to pass through the void in the plurality of loop sections to connect at least two modular units wherein the plurality of loop sections are adapted to align with the edge sections so that one of the plurality of loop sections of one of the plurality of modular units is adjacent to one of the plurality of loop sections of another one of the plurality of modular units;
a first wall unit made of at least one of said plurality of modular units connected together, said first wall unit having two end sections and two flange sections, wherein the plurality of loop sections corresponding to each of the end sections are adapted to connect to form a closed loop;
at least a second wall unit made of at least one of said plurality of modular units, the plurality of loop sections and the plurality of edge sections of the second wall unit are adapted to interlock with the plurality of loop sections and the plurality of edge sections of one of the two flange sections;
wherein the distal edge of a first one of the plurality of loop sections of the second wall unit is adapted to align parallel to a side section of a second one of the plurality of loop sections of the first wall, and the first one of the plurality of loop sections is disposed between a third and a fourth ones of the plurality of loop sections, the third and fourth ones of the plurality of loop sections extending from the flange section of the first wall unit;
wherein one of said connection members is adapted to pass through said second, third and fourth ones of the plurality of loop sections.

12. The system of claim 11 wherein the second wall unit is substantially round and the first wall unit is substantially cylindrical in shape when said first and second ends are connected with one of said connection members.

13. The system of claim 11 wherein an axis defined by one of the plurality of loop sections of one of the end sections of the wall unit is substantially perpendicular to one of the flange sections.

14. The system of claim 11 further comprising:
at least one said plurality of modular units having a plurality of slits located in and passing through the body portion, the body portion having two sides;
wherein the distal edges of the loop sections of another one of said plurality of modular units is adapted to insert into and through the plurality of slits from a first one said two sides; and
wherein one said elongated connection members is adapted to pass through the loop sections of said another modular unit to secure said another one of said plurality of modular units to said at least one said modular units having a plurality of slits.

15. The system of claim 11 wherein the elongated connector that connects the edge sections of the first wall unit is flexible.

16. The system of claim 11 wherein the elongated connector that connects the loops of the flange section to the loops of the second wall unit is made of a semi-rigid material that can be plastically deformed to change shape of the flange.

17. The system of claim 16 wherein the elongated connector is a metal wire.

18. The system of claim 11 wherein the first and second wall units are joined to form a substantially closed structure having an inner volume, the inner volume filled with a compressible material.

19. A system for modular connection comprising:
a plurality of modular units each having a plurality of side sections and configured to connect together along their respective ones of the plurality of side sections to create a three dimensional structure, each of the plurality of modular units comprising:
  a body portion having at least two vertices and a perimeter, wherein the body portion is planar and the perimeter defines the plurality of side sections, each of the plurality of side sections between two vertices;

a plurality of loop sections extending from said body portion, each loop section having a distal edge and a void having an axis;

a plurality of edge sections adjacent to said plurality of loop sections wherein the plurality of loop sections and the plurality of edge sections alternate around the perimeter;

wherein at least one of the at least two vertices has one of the plurality of loop sections and one of the plurality of edge sections adjacent thereto and one of the plurality of side sections includes at least two of the plurality of loop sections;

at least one elongated connection member is adapted to pass through the void in the plurality of loop sections to connect at least two of the plurality of modular units wherein the plurality of loop sections are adapted to align with the edge sections so that one of the plurality of loop sections of a first one of the plurality of modular units is adjacent to one of the plurality of loop sections of a second one of the plurality of modular units; and a connection interface located in an area proximate to a vertex of the first and second modular units;

wherein the loop adjacent to a vertex of the first modular unit interlocks with one of the plurality of edge sections adjacent to the vertex of the second modular unit;

wherein at least one said elongated connectors is adapted to pass through the loop sections of said first and second modular units to connect the first and second modular units at said connection interface.

20. The system of claim 19 wherein the first and second modular units are arranged so that a surface of a face of the first unit faces a surface of a face of the second unit and the plurality of loops of each of the first and second modular units are adapted to interlock with the respective edge sections.

21. The system of claim 20 further comprising at least a third modular unit wherein one of the plurality of loop sections adjacent to a vertex of the second modular unit interlocks with one of the plurality of edge sections adjacent to the vertex of the third modular unit.

22. The system of claim 21 wherein one of the plurality of loop sections adjacent to the vertex of the third modular unit interlocks with one of the plurality of edge sections adjacent to the vertex of the first modular unit.

23. The system of claim 20 further comprising at least one next modular unit, wherein one of the plurality of loop sections adjacent to the vertex of a previous modular unit interlocks with one of the edge sections adjacent to the vertex of the next one of said plurality of modular units;

wherein one of the plurality of loop sections of a last of the plurality of modular units of the connection interface is adapted to interlock with one of the plurality of edge sections of the first unit to form a connection interface which includes an opening at the connection interface and is closed in a location extending radially outwards from the opening.

* * * * *